(12) United States Patent
Agrawal et al.

(10) Patent No.: US 11,334,869 B2
(45) Date of Patent: May 17, 2022

(54) METHOD AND SYSTEM FOR ESTABLISHING SECURE COMMUNICATION BETWEEN TERMINAL DEVICE AND TARGET SYSTEM

(71) Applicant: INNOVITI PAYMENT SOLUTIONS PRIVATE LIMITED, Bangalore (IN)

(72) Inventors: Rajeev Agrawal, Bangalore (IN); Hari Charan Ramachandra Rao, Bangalore (IN); Phani Kumar G V, Bangalore (IN); Shashank Agarwal, Bangalore (IN); Kartik Chandrasekar Iyer, Bangalore (IN); Ashish Sood, Bangalore (IN)

(73) Assignee: INNOVITI PAYMENT SOLUTIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 16/498,300

(22) PCT Filed: Mar. 29, 2018

(86) PCT No.: PCT/IB2018/052174
§ 371 (c)(1),
(2) Date: Sep. 26, 2019

(87) PCT Pub. No.: WO2018/178916
PCT Pub. Date: Oct. 4, 2018

(65) Prior Publication Data
US 2020/0034821 A1    Jan. 30, 2020

(30) Foreign Application Priority Data

Mar. 29, 2017    (IN) .............................. 201741011235

(51) Int. Cl.
*G06Q 20/32*    (2012.01)
*G06F 21/36*    (2013.01)
(Continued)

(52) U.S. Cl.
CPC ......... *G06Q 20/3276* (2013.01); *G06F 21/36* (2013.01); *G06F 21/445* (2013.01);
(Continued)

(58) Field of Classification Search
CPC ........ G06Q 10/00; G06Q 20/00; G06Q 30/00; G06Q 40/00; G06Q 20/3276; G06F 21/36;
(Continued)

(56) References Cited

U.S. PATENT DOCUMENTS 7,606,560 B2 * 10/2009 Labrou ................. H04L 63/083
                                                             455/411
8,175,979 B2    5/2012 Baentsch et al.
(Continued)

OTHER PUBLICATIONS

"Philippines: Advantages of using QR PH for e-payments cited", Asia News Monitor, ProQuest Document Id: 2580991401, Oct. 13 (Year: 2021).*
(Continued)

*Primary Examiner* — Frantzy Poinvil
(74) *Attorney, Agent, or Firm* — Hamre, Schumann, Mueller & Larson, P.C.

(57) ABSTRACT

Disclosed herein is a method and system for establishing secure communication between a terminal device and a target system. The method comprises validating the terminal device and the target system based on a communication request received from the terminal device. Upon validation, the terminal device is signaled to generate a Quick Response (QR) code corresponding to the communication request. Subsequently, the QR code generated at the terminal device is processed using a predetermined verification interface configured in a user device for establishing the secure communication between the terminal device and the target system. In an embodiment, the present disclosure helps users in completing a transaction based on the QR code generated
(Continued)

at the terminal device, and thereby eliminates requirement of using a credit card/debit card and the like for completing the transaction.

15 Claims, 6 Drawing Sheets

(51) Int. Cl.
| | | |
|---|---|---|
| G06F 21/44 | (2013.01) | |
| G09C 5/00 | (2006.01) | |
| H04L 9/32 | (2006.01) | |
| H04L 61/10 | (2022.01) | |

(52) U.S. Cl.
CPC .............. *G09C 5/00* (2013.01); *H04L 9/3213* (2013.01); *H04L 9/3273* (2013.01); *H04L 29/12018* (2013.01); *H04L 2209/56* (2013.01)

(58) Field of Classification Search
CPC ....... G06F 21/445; G09C 5/00; H04L 9/3213; H04L 29/12018; H04L 2209/56
USPC ...................................................... 705/3–44
See application file for complete search history.

(56) References Cited

U.S. PATENT DOCUMENTS

| | | | | |
|---|---|---|---|---|
| 8,332,323 | B2* | 12/2012 | Stals | G06Q 20/02 235/379 |
| 8,521,649 | B2* | 8/2013 | Gibson, III | G06Q 20/10 705/42 |
| 8,706,557 | B1* | 4/2014 | Tavares | G06Q 40/12 705/21 |
| 8,924,292 | B1* | 12/2014 | Ellis | G06K 7/1413 705/41 |
| 8,930,271 | B1* | 1/2015 | Ellis | G06Q 30/0224 705/41 |
| 9,043,237 | B2* | 5/2015 | McCarthy | G06Q 20/02 705/35 |
| 9,659,287 | B2* | 5/2017 | Moshal | G06Q 20/3276 |
| 9,787,660 | B2* | 10/2017 | Feng | H04W 12/06 |
| 10,318,957 | B2* | 6/2019 | Phillips | G06Q 20/3274 |
| 2009/0070272 | A1* | 3/2009 | Jain | G06Q 20/325 705/75 |
| 2009/0070872 | A1* | 3/2009 | Cowings | H04L 51/12 726/23 |
| 2011/0251892 | A1* | 10/2011 | Laracey | G06Q 30/0253 705/14.51 |
| 2013/0185210 | A1* | 7/2013 | Dodson | G06Q 20/3276 705/44 |
| 2013/0254116 | A1* | 9/2013 | Hayhow | G06Q 20/3821 705/71 |
| 2013/0262309 | A1* | 10/2013 | Gadotti | G06Q 20/322 705/44 |
| 2014/0019358 | A1* | 1/2014 | Priebatsch | G06Q 20/02 705/44 |
| 2014/0122272 | A1* | 5/2014 | Arzumanyan | G07G 1/14 705/21 |
| 2014/0143055 | A1* | 5/2014 | Johnson | G06Q 30/0257 705/14.55 |
| 2014/0279474 | A1* | 9/2014 | Evans | G06Q 20/40 705/41 |
| 2014/0344157 | A1* | 11/2014 | Suitner | G06Q 20/385 705/44 |
| 2015/0019428 | A1* | 1/2015 | Priebatsch | G06Q 20/027 705/44 |
| 2015/0058227 | A1* | 2/2015 | Dua | G06Q 20/42 705/67 |
| 2015/0356556 | A1* | 12/2015 | Celikyilmaz | G06Q 20/40 705/14.51 |
| 2016/0012400 | A1* | 1/2016 | McCarthy | G06Q 20/12 705/73 |
| 2016/0012465 | A1* | 1/2016 | Sharp | G06Q 20/386 705/14.17 |
| 2016/0301530 | A1* | 10/2016 | He | G06Q 20/00 |
| 2017/0221054 | A1* | 8/2017 | Flurscheim | G06Q 20/3276 |
| 2018/0025334 | A1* | 1/2018 | Pourfallah | G06Q 20/02 705/4 |
| 2018/0330367 | A1* | 11/2018 | Sharma | G06Q 20/3274 |
| 2019/0066089 | A1* | 2/2019 | Miryala | G06Q 20/3274 |
| 2019/0087815 | A1* | 3/2019 | Goldschmidt | G06Q 20/4014 |
| 2019/0122220 | A1* | 4/2019 | Phillips | G06F 21/6218 |
| 2019/0205865 | A1* | 7/2019 | Jamkhedkar | G06Q 20/382 |
| 2019/0356626 | A1* | 11/2019 | Valla | H04L 51/28 |
| 2020/0034821 | A1* | 1/2020 | Agrawal | H04L 29/12018 |

OTHER PUBLICATIONS

"UniCredit taps First Data to launch mobile payment capabilities", Progressive Digital Media Banking, Wealth News, Proquest Document Id. 1545868273, September (Year: 2013).*

International Search Report issued in PCT/IB2018/052174, dated Jul. 23, 2018 (3 pages).

* cited by examiner

METHOD AND SYSTEM FOR ESTABLISHING SECURE COMMUNICATION BETWEEN TERMINAL DEVICE AND TARGET SYSTEM

TECHNICAL FIELD

The present subject matter is, in general, related to electronic transaction and more particularly, but not exclusively, to a method and system for establishing secure communication between a terminal device and a target system.

BACKGROUND

At present, terminal devices such as Electronic Data Capture (EDC) machine are used, on which a user can swipe his/her credit card/debit card and the like to complete transactions. Further, the existing EDC machines make use of communication protocols such as International Organization for Standardization (ISO) specified 'ISO-8583' to communicate with the issuer bank or the payment aggregator to complete the transactions.

However, the existing card based transaction mechanisms pose a limitation that the user must carry his/her debit card/credit card to the terminal device every time a transaction has to be completed. Further, the debit card/credit cards are often subjected to physical damages and/or theft, which ultimately cause inconvenience to the user. Therefore, it is desirable to have a cardless, secure mechanism for completing transactions.

The information disclosed in this background of the disclosure section is only for enhancement of understanding of the general background of the invention and should not be taken as an acknowledgement or any form of suggestion that this information forms the prior art already known to a person skilled in the art

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for establishing secure communication between a terminal device and a target system. The method comprises receiving, by a communication verification system, a communication request from the terminal device for establishing communication between the terminal device and the target system. The communication request is generated at the terminal device when a user initiates a transaction at the terminal device. Upon receiving the communication request, the method comprises verifying the terminal device and the target system based on predetermined registration details for validating the communication request. Further, the method comprises signaling the terminal device for generating a unique Quick Response (QR) code, corresponding to the communication request, upon validating the communication request. Finally, the method comprises establishing the secure communication between the terminal device and the target system when the QR code is processed by a predetermined verification interface configured in a user device, associated with the user.

Further, the present disclosure relates to a communication verification system for establishing secure communication between a terminal device and a target system. The communication verification system comprises a processor and a memory. The memory is communicatively coupled to the processor and stores processor-executable instructions, which on execution cause the processor to receive a communication request from the terminal device to establish communication between the terminal device and the target system. The communication request is generated at the terminal device when a user initiates a transaction at the terminal device. Further, the instructions cause the processor to verify the terminal device and the target system based on predetermined registration details to validate the communication request. Upon validating the communication request, the instructions cause the processor to signal the terminal device to generate a unique Quick Response (QR) code, corresponding to the communication request. Finally, the instructions cause the processor to establish the secure communication between the terminal device and the target system when the QR code is processed by a predetermined verification interface configured in a user device, associated with the user.

Furthermore, the present disclosure relates to a terminal device for establishing communication with the target system. The terminal device comprises a data reception module, configured to receive a transaction initiation request from a user. Further, the terminal device comprises a communication request generation module to generate a communication request upon receiving the transaction initiation request from the user. Furthermore, the terminal device comprises a Quick Response (QR) code generator for generating a unique QR code corresponding to the communication request. Also, the terminal device comprises a display interface for displaying the QR code.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
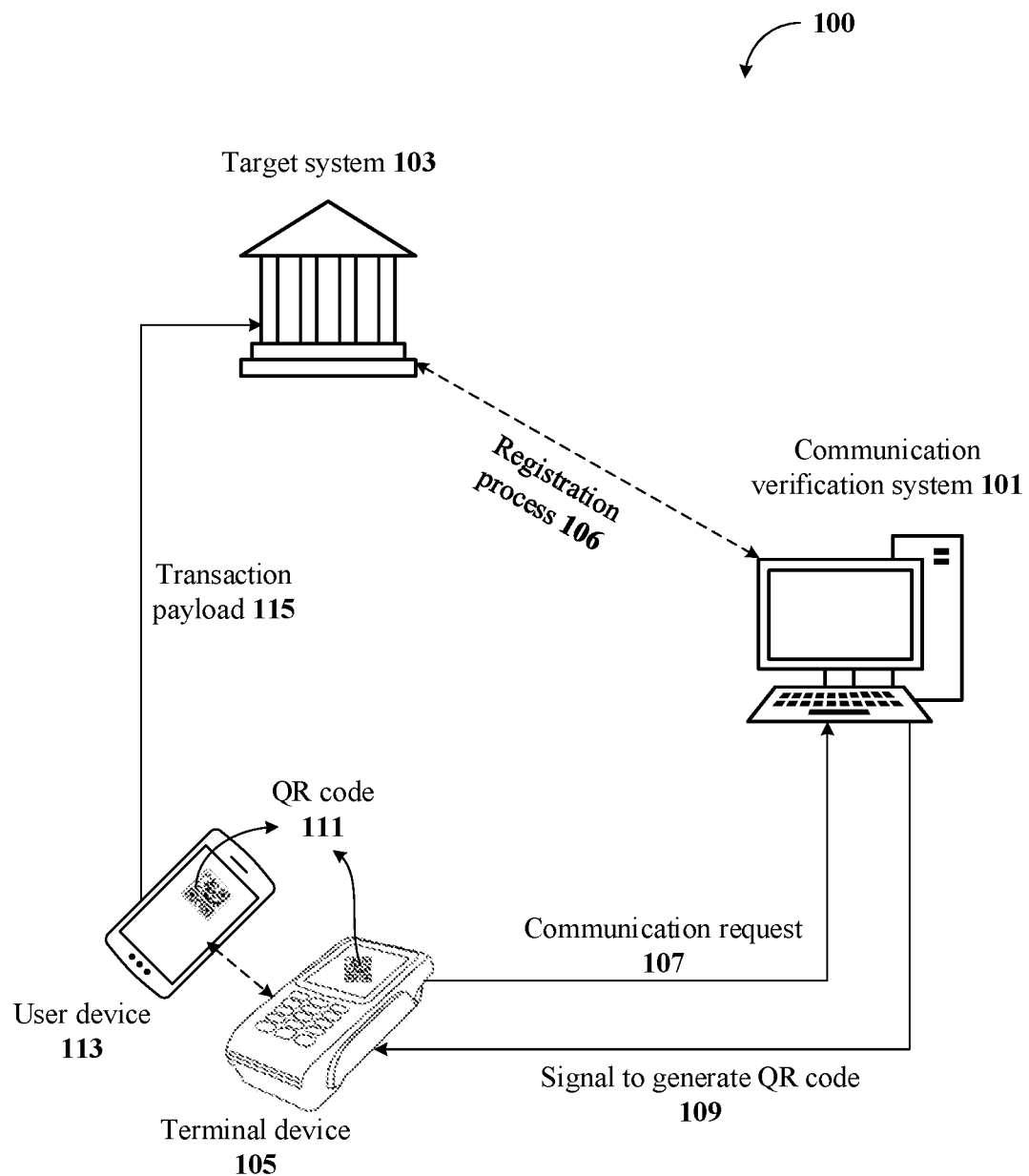
FIG. 1 illustrates an exemplary environment for establishing secure communication between a terminal device and a target device in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a communication system for establishing secure communication between a terminal device and a target system. In an embodiment, the present disclosure enables users to complete financial transactions by processing transaction-specific Quick Response (QR) codes being generated and displayed on the terminal device, such as an Electronic Data Capture (EDC). The QR codes generated at the terminal device may be processed using a predetermined verification interface, such as Unified Payment Interface (UPI) or BharatQR (BQR) interface, which are enabled through mobile applications configured in user device, like Bharat Interface for Money (BHIM), in lieu of the credit card/debit card and the like.

In an embodiment, the UPI/BQR enabled mobile applications configured in the user devices and the transaction-specific QR codes being generated at the terminal devices may be directly verified by an issuer bank and linked to bank accounts of the users, thus ensuring that a secure communication is established for the transaction. Further, since the terminal devices are enabled to work with the UPI/BQR enabled mobile applications, the instant disclosure potentially eliminates usage of the debit cards/credit cards for completing a financial transaction. In other words, the present disclosure provides a 'bridge' between the "offline" and "online" world of financial transactions, wherein the terminal devices, which are used for "offline" transactions shall be enhanced to work in the "online" mode using the UPI/BQR enabled mobile applications and QR codes.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for establishing secure communication between a terminal device 105 and a target device in accordance with some embodiments of the present disclosure.

In some implementations, the environment 100 may include a communication verification system 101, a terminal device 105 and a target system 103. The communication verification system 101 may be any computing device such as a desktop computer, a laptop, a smartphone and the like, which is capable of being configured to establish secure communication between the terminal device 105 and the target system 103 as per embodiments of the present disclosure. In an implementation, the communication verification system 101 may be a centralized server, which bridges all communication between the terminal device 105 and the target system 103 upon verifying and registering both the terminal device 105 and the target system 103.

The target system 103 may be any financial institution such as an issuer bank which holds bank account of the user, a payment aggregator associated with the issuer bank and the like. In an embodiment, more than one target systems 103 may be involved in a transaction, and each of the target systems 103 may be registered with the communication verification system 101 using a registration process 106. During the registration process 106, the communication verification system 101 may receive various registrations details such as a target system 103 identifier, a Virtual Private Address (VPA) of the terminal device 105, and a target channel identifier from the target system 103 and store the registration details thus received in a database associated with the communication verification system 101. Subsequently, when a communication request 107 is received from the terminal device 105, the communication verification system 101 may use the registration details stored in the database to verify the target system 103 and to validate the communication request 107 made by the terminal device 105.

In an embodiment, the terminal device 105 may be an Electronic Data Capture (EDC), a magnetic card reader/swipe machine, a Point of Sale (PoS) device and the like, which may be used for initiating a transaction with the target system 103. The terminal device 105 may be configured at various retail stores such as, without limiting to, a shopping arena, a general merchant store, ticket vending systems, Automated Teller Machines (ATMs) and the like.

In an embodiment, when a user initiates a transaction at the terminal device 105, the terminal device 105 generates a communication request 107 and transmits the communication request 107 to the communication verification system 101, requesting the communication verification system 101 to establish a secure communication with the target system 103 specified in the communication request 107. As an example, the communication request 107 may include, without limiting to, a transaction request, a unique transaction identifier and transaction-specific information. The transaction request may specify the target system 103 identifier, specific to the target system 103 in which the user has an account. Further, the transaction-specific information may include information related to items purchased by the user, value of the transaction and the like.

In an embodiment, upon receiving the communication request 107 from the terminal device 105, the communication verification system 101 may verify the communication request 107 by processing the communication request 107 and comparing them with the registration details of the target system 103, which is pre-stored in the database of the communication verification system 101. Upon successful verification, the communication verification system 101 may transmit a signal 109 to the terminal device 105 for generating a unique, transaction-specific Quick Response (QR) code 111. Subsequently, the terminal device 105 may generate the transaction-specific QR code 111 and display it on a display interface associated with the terminal device 105. As an example, the signal 109 may include a QR code generation string, using which the terminal device 105 may generate the QR code 111.

In an embodiment, the user may complete the transaction with the target system 103 by scanning the QR code 111, being displayed on the terminal device 105, using a user device 113 associated with the terminal device 105, and then processing the QR code 111 through a predetermined verification interface configured in the user device 113. As an example, the predetermined verification interface may include a secure payment interface such as Unified Payment Interface (UPI) or BharatQR (BQR) interface, and an application such as Bharat Interface for Money (BHIM) which is enabled with the UPI/BQR. In an embodiment, when the QR code 111 is processed by the user device 113, a transaction payload 115, comprising information related to the transaction, may be generated at the user device 113.

In an embodiment, the user device 113 may transmit the transaction payload 115 to the target system 103 for receiving a transaction approval from the target system 103. The target system 103 may validate the transaction information comprised in the transaction payload 115 and generate a transaction authorization message. Subsequently, the communication verification system 101 may receive the transaction authorization message from the target system 103, and verify the transaction authorization message with the transaction information received from the terminal device 105 to establish the secure communication between the terminal device 105 and the target system 103.

Figure 2A:
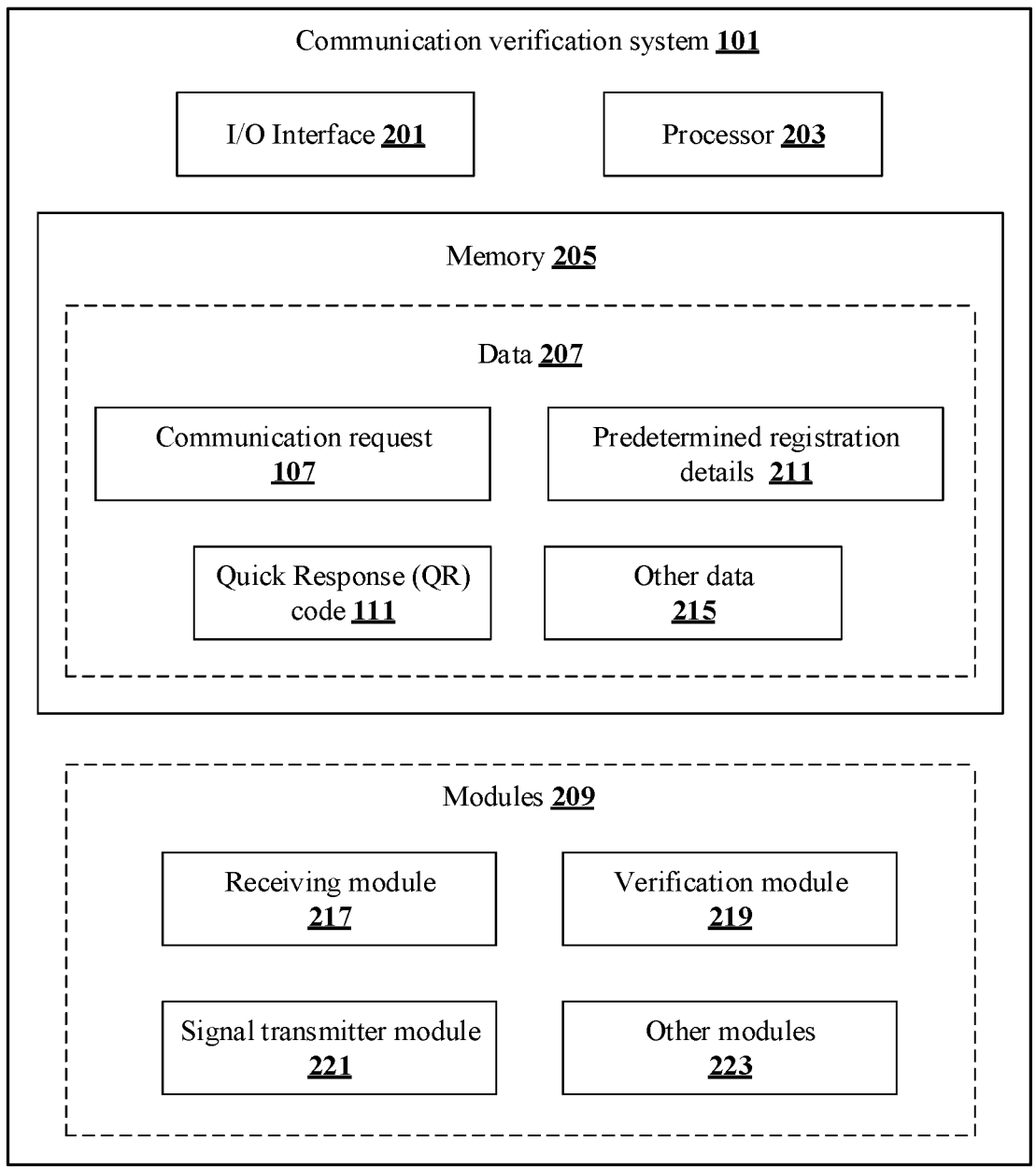
FIG. 2A shows a detailed block diagram illustrating a communication verification system in accordance with some embodiments of the present disclosure.

FIG. 2A shows a detailed block diagram illustrating a communication verification system 101 in accordance with some embodiments of the present disclosure.

In an implementation, the communication verification system 101 may include an I/O interface 201, a processor 203, and a memory 205. The I/O interface 201 may be configured to receive a communication request 107 from a terminal device 105, and to transmit a signal 109 to the terminal device 105 for generating a unique Quick Response (QR) code 111 at the terminal device 105. Further, the I/O interface 201 may also be used for communicating with a target system 103 for registering the target system 103 with the communication verification system 101. The memory 205 may be communicatively coupled to the processor 203. The processor 203 may be configured to perform one or more functions of the communication verification system 101.

In some implementations, the communication verification system 101 may include data 207 and modules 209 for performing various operations in accordance with embodiments of the present disclosure. In an embodiment, the data 207 may be stored within the memory 205 and may include information related to, without limiting to, the communication request 107, predetermined registration details 211, the Quick Response (QR) code 111, and other data 215.

In some embodiments, the data 207 may be stored within the memory 205 in the form of various data structures. Additionally, the data 207 may be organized using data models, such as relational or hierarchical data models. The other data 215 may store temporary data and files generated by one or more modules 209 while performing various functions of the communication verification system 101.

In an embodiment, the communication request 107 may be generated at the terminal device 105 when a user initiates a transaction at the terminal device 105. As an example, the communication request 107 may include, without limiting to, information related to a transaction request, a unique transaction identifier and transaction-specific information. The transaction-specific information may include information related to goods/items purchased by the user, value of the goods and the like.

In an embodiment, the predetermined registrations details may include information related to the terminal device 105 and the target system 103, which are used to register the terminal device 105 and the target system 103 with the communication verification system 101. As an example, the predetermined registration details 211 may include, without limiting to, a terminal identifier, a target system 103 identifier, a Virtual Private Address (VPA) specific to the terminal device 105, and a target channel identifier.

In an embodiment, the QR code 111 may be generated by the terminal device 105 upon receiving a signal 109 from the communication verification system 101. The QR code 111 acts as a unique, transaction-specific identifier, which produces a unique, transaction payload 115 when processed by a predetermined verification interface configured in the user device 113.

In an embodiment, each of the data 207 stored in the communication verification system 101 may be processed by one or more modules 209 of the communication verification system 101. In one implementation, the one or more modules 209 may be stored as a part of the processor 203. In another implementation, the one or more modules 209 may be communicatively coupled to the processor 203 for performing one or more functions of the communication verification system 101. The modules 209 may include, without limiting to, a receiving module 217, a verification module 219, a signal transmitter module 221 and other modules 223.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 225 may be used to perform various miscellaneous functionalities of the communication verification system 101, and may include various communication interfaces, storage controllers and the like. It will be appreciated that such modules 209 may be represented as a single module or a combination of different modules.

In an embodiment, the receiving module 217 may be responsible for receiving the communication request 107 from the terminal device 105. Further, the receiving module 217 may be used for receiving one or more registration details from the target system 103 during registration of the target system 103 with the communication verification system 101. In an implementation, the communication verification system 101 may receive/transmit information to/from the terminal device 105 and the target system 103 using a wired and/or a wireless communication interface.

In an embodiment, the verification module 219 may be responsible for verifying the communication request 107 received from the terminal device 105 by comparing the information comprised in the communication request 107 with one or more predetermined registration details 211 stored in the communication verification system 101. Further, the signal transmitter module 221 may be used to transmit the signal 109 to the terminal device 105 to generate the QR code 111 upon successful verification of the communication request 107.

Figure 2B:
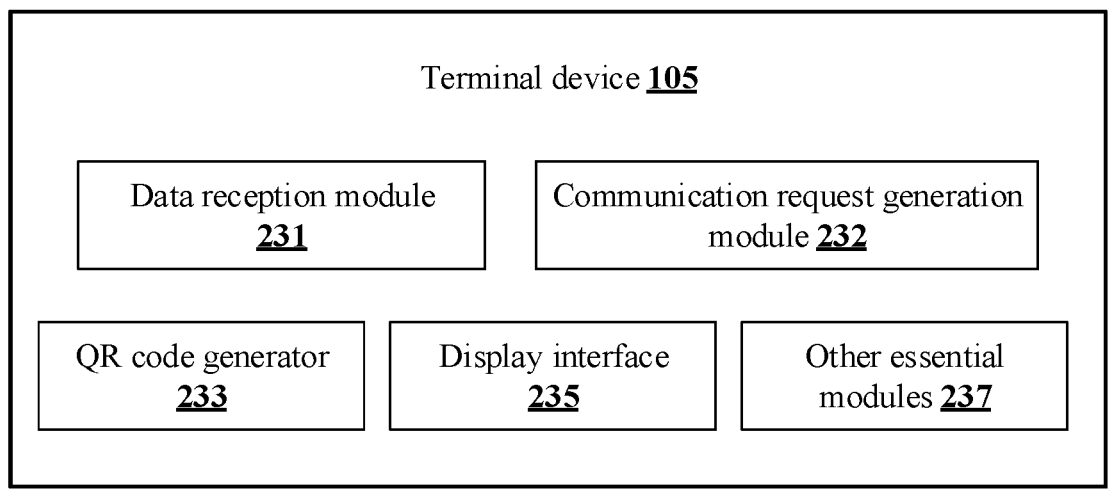
FIG. 2B shows a detailed block diagram illustrating a terminal device in accordance with some embodiments of the present disclosure.

FIG. 2B shows a detailed block diagram illustrating a terminal device 105 in accordance with some embodiments of the present disclosure.

As shown in FIG. 2B, the terminal device 105 may include a data reception module 231, a communication request generation module 232, a QR code generator 233, a display interface 235 and other essential modules 237. The data reception module 231 may be used for receiving a transaction initiation request from a user. The transaction initiation request may include one or more data/information related to the transaction such as, bank account credentials of the user, value of the transaction, and passwords or pins required for accessing the bank account of the user.

In an implementation, the communication request generation module 232 may be used for generating a communication request 107 upon receiving the transaction initiation request from the user. As an example, the communication request 107 may include, without limiting to, a transaction request, a unique transaction identifier and transaction-specific information. The transaction request may specify the target system 103 identifier, specific to the target system 103 in which the user has an account. Further, the transaction-specific information may include information related to items purchased by the user, value of the transaction and the like.

In an implementation, the QR code generator 233 may be used for generating the unique, transaction-specific QR code 111 in the terminal device 105, upon receiving a signal 109 from the communication verification system 101. In an implementation, the QR generated by the QR code generator 233 may be displayed on the display interface 235 of the terminal device 105. Additionally, the display interface 235 may be used for displaying various information like the transaction authorization message for notifying the user or the operator that the transaction has been verified and approved.

In an embodiment, the other essential modules 237 in the terminal device 105 may include a power management module, a storage controller and various communication interface that enable the terminal device 105 to communicate with the communication verification system 101, the target system 103 and the user device 113.

Figure 3A:
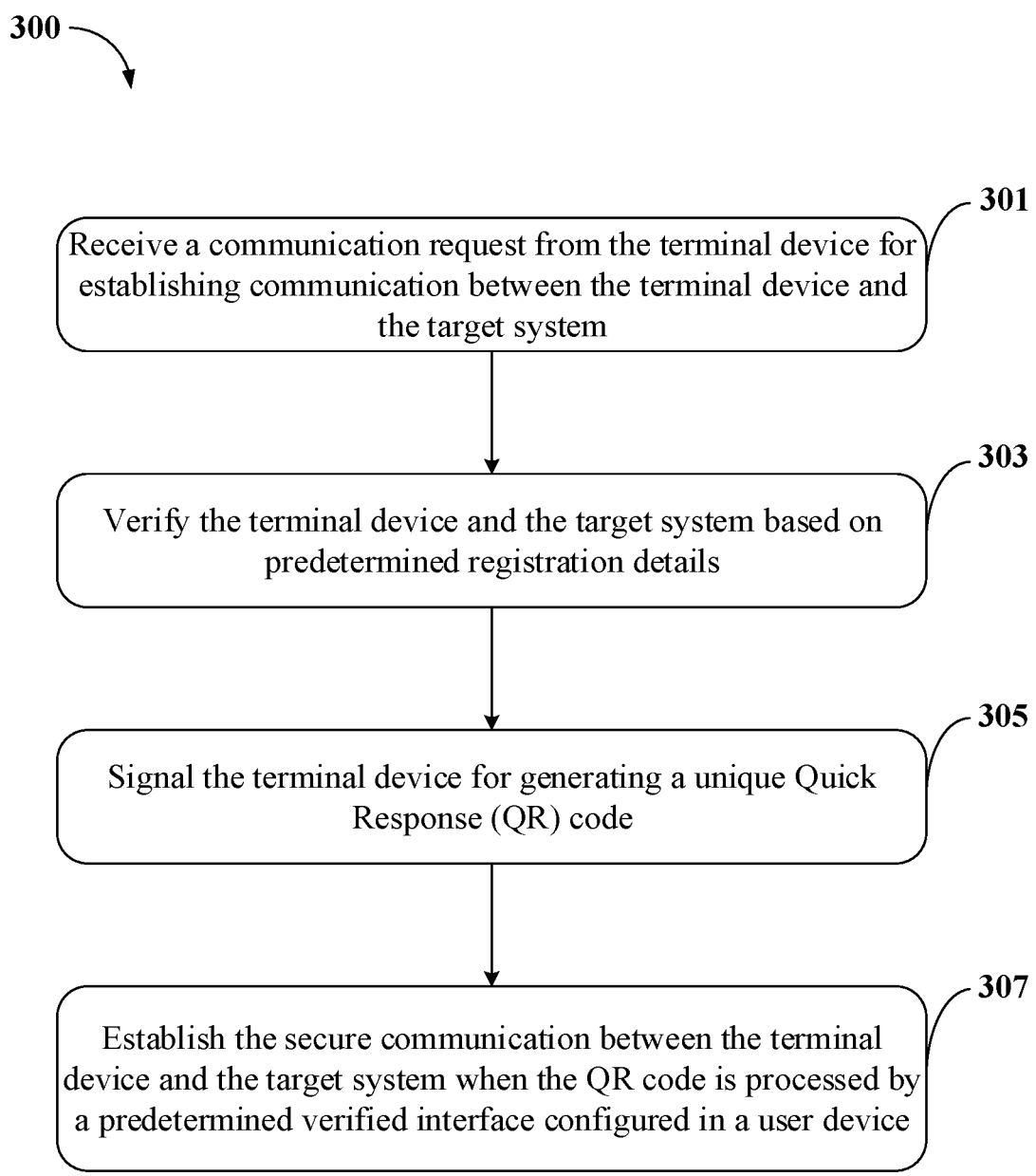
FIG. 3A shows a flowchart illustrating a method of establishing secure communication between a terminal device and a target device in accordance with some embodiments of the present disclosure.

FIG. 3A shows a flowchart illustrating a method of establishing secure communication between a terminal device 105 and a target device in accordance with some embodiments of the present disclosure.

As illustrated in FIG. 3A, the method 300 includes one or more blocks illustrating a method of establishing secure communication between a terminal device 105 and a target system 103 using a communication verification system 101 for example, the communication verification system 101 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by the communication verification system 101, a communication request 107 from the terminal device 105 for establishing communication between the terminal device 105 and the target system 103. In an implementation, the communication request 107 may be generated at the terminal device 105 when a user initiates a transaction at the terminal device 105. As an example, the communication request 107 may comprise a transaction request, a unique transaction identifier and transaction-specific information.

At block 303, the method 300 includes verifying, by the communication verification system 101, the terminal device 105 and the target system 103 based on predetermined registration details 211, for validating the communication request 107. As an example, the predetermined registration details 211 may comprise a terminal identifier, a target system 103 identifier, a Virtual Private Address (VPA) of the terminal device 105, and a target channel identifier.

At block 305, the method 300 includes signaling, by the communication verification system 101, the terminal device 105 for generating a unique Quick Response (QR) code 111, corresponding to the communication request 107, upon validating the communication request 107. In an embodiment, the unique QR code generated by the terminal device 105 may be displayed on a display interface 235 associated with the terminal device 105.

At block 307, the method 300 includes establishing, by the communication verification system 101, the secure communication between the terminal device 105 and the target system 103 when the QR code 111 is processed by a predetermined verification interface configured in a user device 113, associated with the user. In an embodiment, the QR code 111 may be processed by scanning the QR code 111 through the predetermined verification interface, and then decoding the QR code 111 for extracting information related to the transaction. Further, a transaction payload 115, corresponding to the information related to transaction, may be generated using the predetermined verification interface. As an example, the information related to the transaction may include name of the user, a unique identifier of the user, a user-specific VPA, and the predetermined registration details 211.

In an embodiment, the transaction payload 115 generated at the user device 113 may be transmitted to the target system 103, through the user device 113, for authorizing the transaction. The target system 103 may generate a transaction authorization message upon validating the transaction payload 115, and may transmit the transaction authorization message to the communication verification system 101 as a Uniform Resource Locator (URL) callback. In an embodiment, the communication verification system 101 may authorize the transaction when the information related to the transaction, received from the terminal device 105, matches with the transaction authorization message received from the target system 103.

Figure 3B:
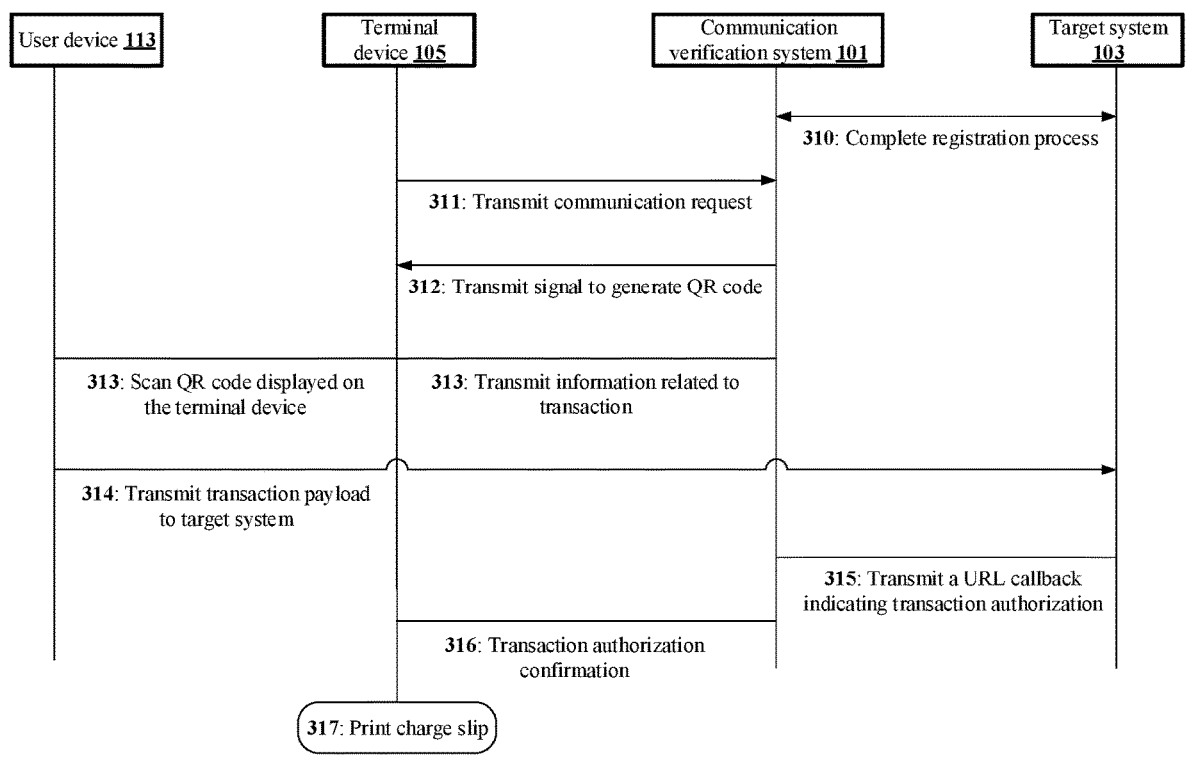
FIG. 3B shows a sequence diagram illustrating sequence of actions performed while establishing a secure communication between the terminal device and the target system in accordance with some embodiments of the present disclosure.

FIG. 3B shows a sequence diagram illustrating sequence of actions performed while establishing a secure communication between the terminal device and the target system in accordance with some embodiments of the present disclosure.

At sequence 310, the target system 103 registers itself with the communication verification system 101 using a registration process 106 illustrated in FIG. 1. At sequence 311, the terminal device 105 transmits a communication request 107 to the communication verification system 101, requesting the communication verification system 101 to establish a communication between the terminal device 105 and the target system 103. At sequence 312, the communication verification system 101 validates the communication request and signals the terminal device 105 for generating a unique Quick Response (QR) code 111 corresponding to the communication request. At sequence 313, the terminal device 105 generates the QR code 111 and displays the QR code 111 on a display interface associated with the terminal device 105. Simultaneously, at sequence 313, the terminal device 105 transmits information related to the transaction to the communication verification system 101. At sequence 314, the QR code 111 being displayed on the display interface associated with the terminal device 105 is scanned using a UPI enabled mobile application configured in a user device 113. Further, upon successful processing of the QR code 111 at the user device 113, the user device 113 transmits a transaction payload 115 to the target system 103. At sequence 315, the target system 103 validates the transaction payload 115 and generates a transaction authorization message. Further, the target system 103 transmits the transaction authorization message to the communication verification system 101 as a URL callback, to indicate the communication verification system 101 about the transaction authorization. At sequence 316, the communication verification system 101 compares the information related to the transaction, received from the terminal device 105, with the transaction authorization message received from the target system 103 and transmits a transaction authorization confirmation to the terminal device 105. Finally, at sequence 317, the terminal device 105 prints a charge slip for the transaction.

Computer System

Figure 4:
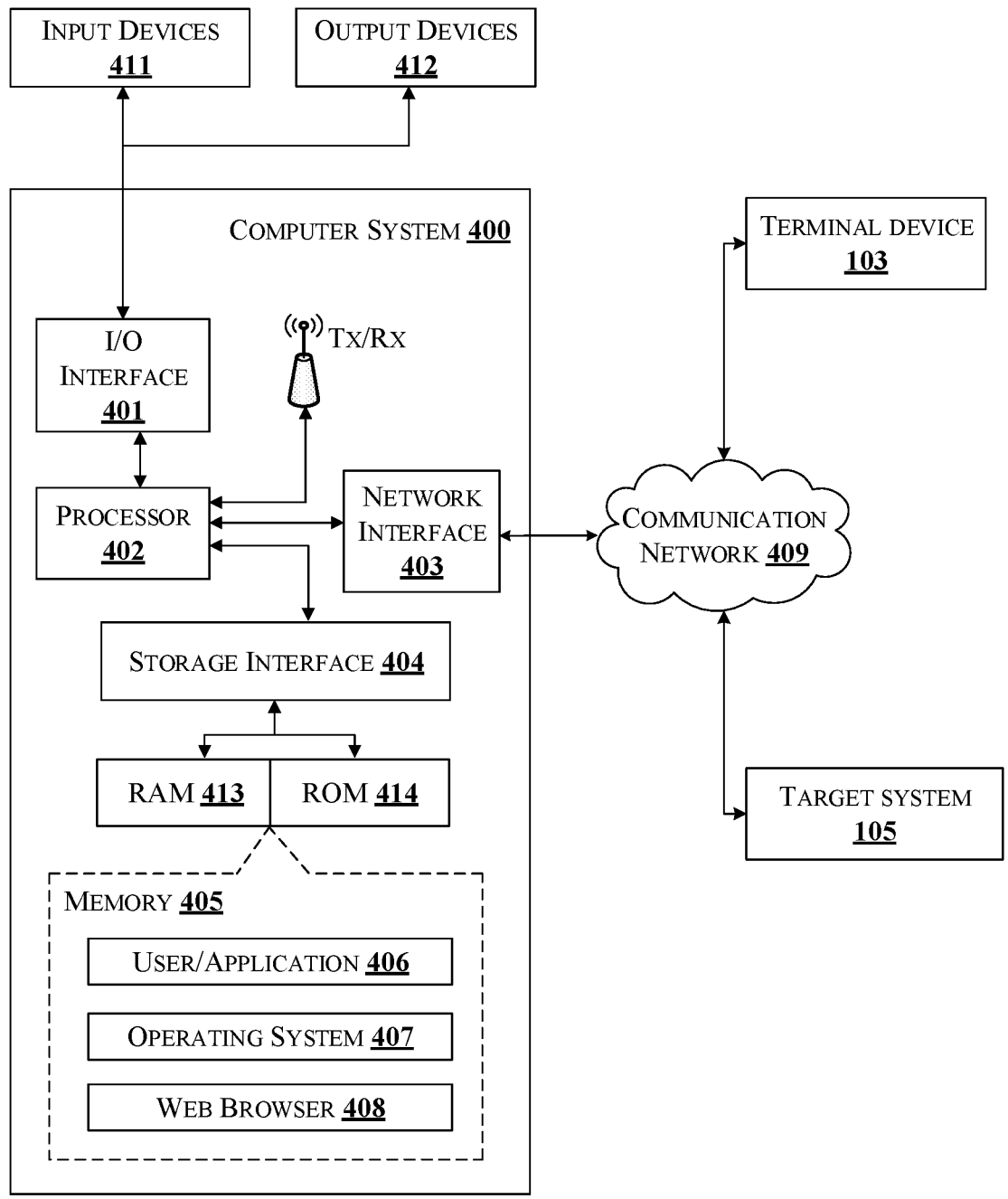
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be communication verification system 101 shown in FIG. 1, which may be used for establishing secure communication between a terminal device 105 and a target system 103. The computer system 400 may include a central processing unit ("CPU" or "processor") 402. The processor 402 may comprise at least one data processor for executing program components for executing user- or system-generated business processes. A user may include a person, a user in the computing environment 100, or any system/subsystem being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a user device 113, such as a smartphone, a laptop, or a desktop computer associated with the user, through which the user may input information related to the transaction, and scan the Quick Resource (QR) code 111 generated at the terminal device 105.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may connect to the terminal device 105 for receiving a transaction request from the terminal device 105, and for signaling the terminal device 105. Similarly, the computer system 400 may use the communication network 409 for completing registration of the target system 103.

In an implementation, the communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure discloses a method for establishing secure communication between a terminal device and a target system.

In an embodiment, the method of present disclosure completes a transaction based on a Quick Response (QR) code generated at the terminal device, and thereby eliminates requirement of using a credit card/debit card and the like for completing a transaction at the terminal device.

In an embodiment, the method of present disclosure enables usage of Unified Payment Interface (UPI) or BharatQR (BQR) interface at the terminal device, thereby providing a hassle-free, pervasive payment mechanism across the retail segment.

In an embodiment, the method of present disclosure also helps customers in avoiding and/or reducing Merchant Discount Rate (MDR) charges associated with the transactions, by allowing the customers to use UPI/BQR enabled mobile applications for accomplishing the transactions.

In an embodiment, the method of present disclosure enhances the terminal device, such as Electronic Data Capture (EDC) machines, to generate transaction-specific QR codes, which could be used by the user for verifying the transaction. Thus, the present disclosure provides a "bridge" between the "offline" and "online" world of financial payments, wherein the EDC machines which are used for "offline" payments are integrated to work with QR codes.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Communication verification system |
| 103 | Target system |
| 105 | Terminal device |
| 106 | Registration process |
| 107 | Communication request |
| 109 | Signal to generate QR code (signal) |
| 111 | QR code |
| 113 | User device |
| 115 | Transaction payload |
| 201 | I/O interface |
| 203 | Processor |
| 205 | Memory |
| 207 | Data |
| 209 | Modules |
| 211 | Predetermined registration details |
| 215 | Other data |
| 217 | Receiving module |
| 219 | Verification module |
| 221 | Signal transmitter module |
| 223 | Other modules |
| 231 | Data reception module |
| 232 | Communication request generation module |
| 233 | QR code generator |
| 235 | Display interface |
| 237 | Other essential modules |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

The invention claimed is:

1. A method for establishing secure communication between a terminal device (105) and a target system (103), the method comprising:
receiving, by a communication verification system (101), a communication request (107) from the terminal device (105) for establishing communication between the terminal device (105) and the target system (103), wherein the communication request (107) is generated at the terminal device (105) when a user initiates a transaction at the terminal device (105);
verifying, by the communication verification system (101), the terminal device (105) and the target system (103) based on predetermined registration details (211), for validating the communication request (107);
signaling, by the communication verification system (101), the terminal device (105) for generating a unique Quick Response (QR) code (111), corresponding to the communication request (107), upon validating the communication request (107); and
establishing, by the communication verification system (101), the secure communication between the terminal device (105) and the target system (103) when the QR code (111) is processed by a predetermined verification interface configured in a user device (113), associated with the user.

2. The method as claimed in claim 1, wherein the communication request (107) comprises a transaction request, a unique transaction identifier and transaction-specific information.

3. The method as claimed in claim 1, wherein the predetermined registration details (211) comprises a terminal identifier, a target system (103) identifier, a Virtual Private Address (VPA) of the terminal device (105), and a target channel identifier.

4. The method as claimed in claim 1, wherein the unique QR code (111) generated by the terminal device (105) is displayed on a display interface (235) associated with the terminal device (105).

5. The method as claimed in claim 1, wherein processing the QR code (111) further comprises:
scanning the QR code (111) through the predetermined verification interface configured in the user device (113);
decoding, through the predetermined verification interface, the QR code (111) for extracting information related to the transaction;
generating, using the predetermined verification interface, a transaction payload (115) corresponding to the information related to the transaction; and
transmitting, through the user device (113), the transaction payload (115) to the target system (103) for authorizing the transaction.

6. The method as claimed in claim 5, wherein the information related to the transaction comprises name of the user, a unique identifier of the user, a user-specific VPA, and the predetermined registration details (211).

7. The method as claimed in claim 5, wherein authorizing the transaction comprises:
receiving, by the communication verification system (101), the information related to the transaction from the terminal device (105);
receiving, by the communication verification system (101), a transaction authorization message from the target system (103), wherein the transaction authorization message is generated at the target system (103) upon validating the transaction payload (115) received from the user device (113); and
comparing, by the communication verification system (101), the information related to the transaction with the transaction authorization message for authorizing the transaction between the terminal device (105) and the target system (103).

8. A terminal device (105) comprising a processor and memory, the processor configured to:
receive a transaction initiation request from a user;
generate a communication request (107) upon receiving the transaction initiation request and transmit the communication request (107) to a communication verification system (101), wherein the communication request (107) is validated at the communication verification system (101) upon verifying the terminal device (105) and the target system (193) based on a predetermined details (211);

generate a unique Quick Response, QR, code (111) corresponding to the communication request (107), wherein a signal to generate the unique QR code (111) is received from the communication verification system upon validation of the communication request (107); and display the QR code (111), wherein the QR code, when processed by a predetermined verification interface configured in a user interface device (113), facilitates establishing a secure communication between the terminal device (105) and the target system (103).

9. A communication verification system (101) for establishing secure communication between a terminal device (105) and a target system (103), the communication verification system (101) comprising:

a processor (203); and a memory (205), communicatively coupled to the processor (203), wherein the memory (205) stores processor-executable instructions, which on execution cause the processor (203) to:

receive a communication request (107) from the terminal device (105) to establish communication between the terminal device (105) and the target system (103), wherein the communication request (107) is generated at the terminal device (105) when a user initiates a transaction at the terminal device (105);

verify the terminal device (105) and the target system (103) based on predetermined registration details (211) to validate the communication request (107);

signal the terminal device (105) to generate a unique Quick Response (QR) code (111), corresponding to the communication request (107), upon validating the communication request (107); and establish the secure communication between the terminal device (105) and the target system (103) when the QR code (111) is processed by a predetermined verification interface configured in a user device (113), associated with the user.

10. The communication verification system (101) as claimed in claim 9, wherein the communication request (107) comprises a transaction request, a unique transaction identifier and transaction-specific information.

11. The communication verification system (101) as claimed in claim 9, wherein the predetermined registration details (211) comprises a terminal identifier, a target system (103) identifier, a Virtual Private Address (VPA) of the terminal device (105), and a target channel identifier.

12. The communication verification system (101) as claimed in claim 9, wherein the processor (203) displays the unique QR code (111) generated by the terminal device (105) on a display interface (235) associated with the terminal device (105).

13. The communication verification system (101) as claimed in claim 9, wherein to process the QR code (111), the processor (203) is further configured to:

scan the QR code (111) through the predetermined verification interface configured in the user device (113);

decode, through the predetermined verification interface, the QR code (111) for extracting information related to the transaction;

generate, using the predetermined verification interface, a transaction payload (115) corresponding to the information related to the transaction; and transmit, through the user device (113), the transaction payload (115) to the target system (103) for authorizing the transaction.

14. The communication verification system (101) as claimed in claim 13, wherein the information related to the transaction comprises name of the user, a unique identifier of the user, a user-specific VPA, and the predetermined registration details (211).

15. The communication verification system (101) as claimed in claim 13, wherein to authorize the transaction, the processor (203) is further configured to:

receive the information related to the transaction from the terminal device (105);

receive a transaction authorization message from the target system (103), wherein the transaction authorization message is generated at the target system (103) upon validating the transaction payload (115) received from the user device (113); and compare the information related to the transaction with the transaction authorization message to authorize the transaction between the terminal device (105) and the target system (103).

\* \* \* \* \*